US012732600B2

(12) United States Patent
Sheng

(10) Patent No.: US 12,732,600 B2
(45) Date of Patent: Sep. 8, 2026

(54) INFORMATION PROCESSING METHOD, INFORMATION PROCESSING APPARATUS AND ELECTRONIC DEVICE

(71) Applicant: Lenovo (Beijing) Limited, Beijing (CN)

(72) Inventor: Yanmei Sheng, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 46 days.

(21) Appl. No.: 18/746,650

(22) Filed: Jun. 18, 2024

(65) Prior Publication Data

US 2025/0008066 A1 Jan. 2, 2025

(30) Foreign Application Priority Data

Jun. 30, 2023 (CN) ......................... 202310804309.5

(51) Int. Cl.
*H04N 9/87* (2006.01)
*G11B 27/34* (2006.01)

(52) U.S. Cl.
CPC ........... *H04N 9/8715* (2013.01); *G11B 27/34* (2013.01)

(58) Field of Classification Search
CPC .................................................... H04N 9/8715
See application file for complete search history.

(56) References Cited

U.S. PATENT DOCUMENTS

2023/0029698 A1* 2/2023 Hong ................. H04N 21/8541

* cited by examiner

*Primary Examiner* — Girumsew Wendmagegn
(74) *Attorney, Agent, or Firm* — ANOVA LAW GROUP, PLLC

(57) ABSTRACT

Information processing method, information processing apparatus, and electronic device are provided. The information processing method includes: acquiring target data; outputting the target data in response to a play instruction, the target data being configured to continuously present a plurality of frames of images within a target period; acquiring an input operation before an end of the target period; and changing an output effect of a target object based on a response of the target object to the input operation if a target image corresponding to the input operation includes the target object. The output effect changed by the response of the target object to the input operation does not affect the output effect of the target object in a continuous presentation of the plurality of frames of images within the target period.

20 Claims, 3 Drawing Sheets

Acquiring target data including at least first data and second data, the first data including a plurality of frames of image data excluding the target object and the second data including a plurality of pieces of object data and the plurality of frames of image data corresponds to the plurality of pieces of object data — 201

Reading target image data in the first data frame by frame in response to the play instruction and simultaneously reading the target object data in the second data with a corresponding relationship with the target image data — 202

Superimposing the target object data and the target image data if the target object data can be read and presenting a superimposed image containing the target object — 203

Acquiring an input operation before an end of a target period — 204

Changing an output effect of the target object based on a response of the target object to the input operation if a target image corresponding to the input operation includes a target object — 205

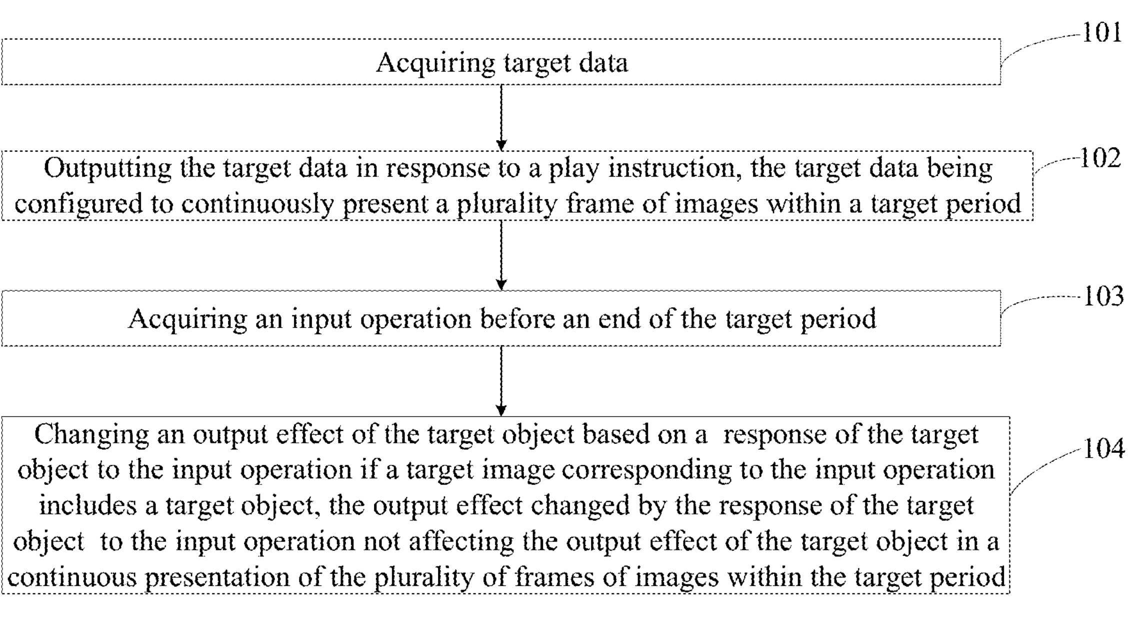

FIG. 1

Acquiring target data including at least first data and second data, the first data including a plurality of frames of image data excluding the target object and the second data including a plurality of pieces of object data and the plurality of frames of image data corresponds to the plurality of pieces of object data

201

Reading target image data in the first data frame by frame in response to the play instruction and simultaneously reading the target object data in the second data with a corresponding relationship with the target image data

202

Superimposing the target object data and the target image data if the target object data can be read and presenting a superimposed image containing the target object

203

Acquiring an input operation before an end of a target period

204

Changing an output effect of the target object based on a response of the target object to the input operation if a target image corresponding to the input operation includes a target object

INFORMATION PROCESSING METHOD, INFORMATION PROCESSING APPARATUS AND ELECTRONIC DEVICE

CROSS-REFERENCE TO RELATED APPLICATION

This application claims priority of Chinese Patent Application No. 202310804309.5, filed on Jun. 30, 2023, the entire contents of which are hereby incorporated by reference.

FIELD OF THE DISCLOSURE

The present disclosure generally relates to the field of information technology and, more particularly, relates to an information processing method, an information processing apparatus, and an electronic device.

BACKGROUND

Significant advancements in digital technology and information technology have led to rapid development in digital interactive experience design, especially in the audio and video field, resulting in a series of technological breakthroughs. However, due to constant updates and iterations of new scenarios and new products, current interactive experiences remain limited, lacking user engagement.

BRIEF SUMMARY OF THE DISCLOSURE

One aspect of the present disclosure provides an information processing method. The information processing method includes: acquiring target data; outputting the target data in response to a play instruction, the target data being configured to continuously present a plurality of frames of images within a target period; acquiring an input operation before an end of the target period; and changing an output effect of a target object based on a response of the target object to the input operation if a target image corresponding to the input operation includes the target object. The output effect changed by the response of the target object to the input operation does not affect the output effect of the target object in a continuous presentation of the plurality of frames of images within the target period.

Another aspect of the present disclosure provides an information processing apparatus. The apparatus includes: an acquisition unit, for acquiring target data and acquiring an input operation before an end of a target period; an output unit, for outputting the target data in response to a play instruction, the target data being configured to continuously present a plurality of frames of images within the target period; and a processing unit, for changing an output effect of a target object based on a response of the target object to the input operation if a target image corresponding to the input operation includes the target object. The output effect changed by the response of the target object to the input operation does not affect the output effect of the target object in a continuous presentation of the plurality of frames of images within the target period.

Another aspect of the present disclosure provides an electronic device. The electronic device includes at least one processor, a memory, and a communication bus. The communication bus is configured to realize a communication connection between the processor and the memory. The at least one processor is configured to execute an information processing program in the memory to implement: acquiring target data; outputting the target data in response to a play instruction, the target data being configured to continuously present a plurality of frames of images within a target period; acquiring an input operation before an end of the target period; and changing an output effect of a target object based on a response of the target object to the input operation if a target image corresponding to the input operation includes the target object. The output effect changed by the response of the target object to the input operation does not affect the output effect of the target object in a continuous presentation of the plurality of frames of images within the target period.

Other aspects of the present disclosure can be understood by a person skilled in the art in light of the description, the claims, and the drawings of the present disclosure.

BRIEF DESCRIPTION OF THE DRAWINGS

FIG. 1 illustrates a flow chart of an information processing method consistent with various embodiments of the present disclosure;

FIG. 2 illustrates a flow chart of another information processing method consistent with various embodiments of the present disclosure;

DETAILED DESCRIPTION

Figure 3:
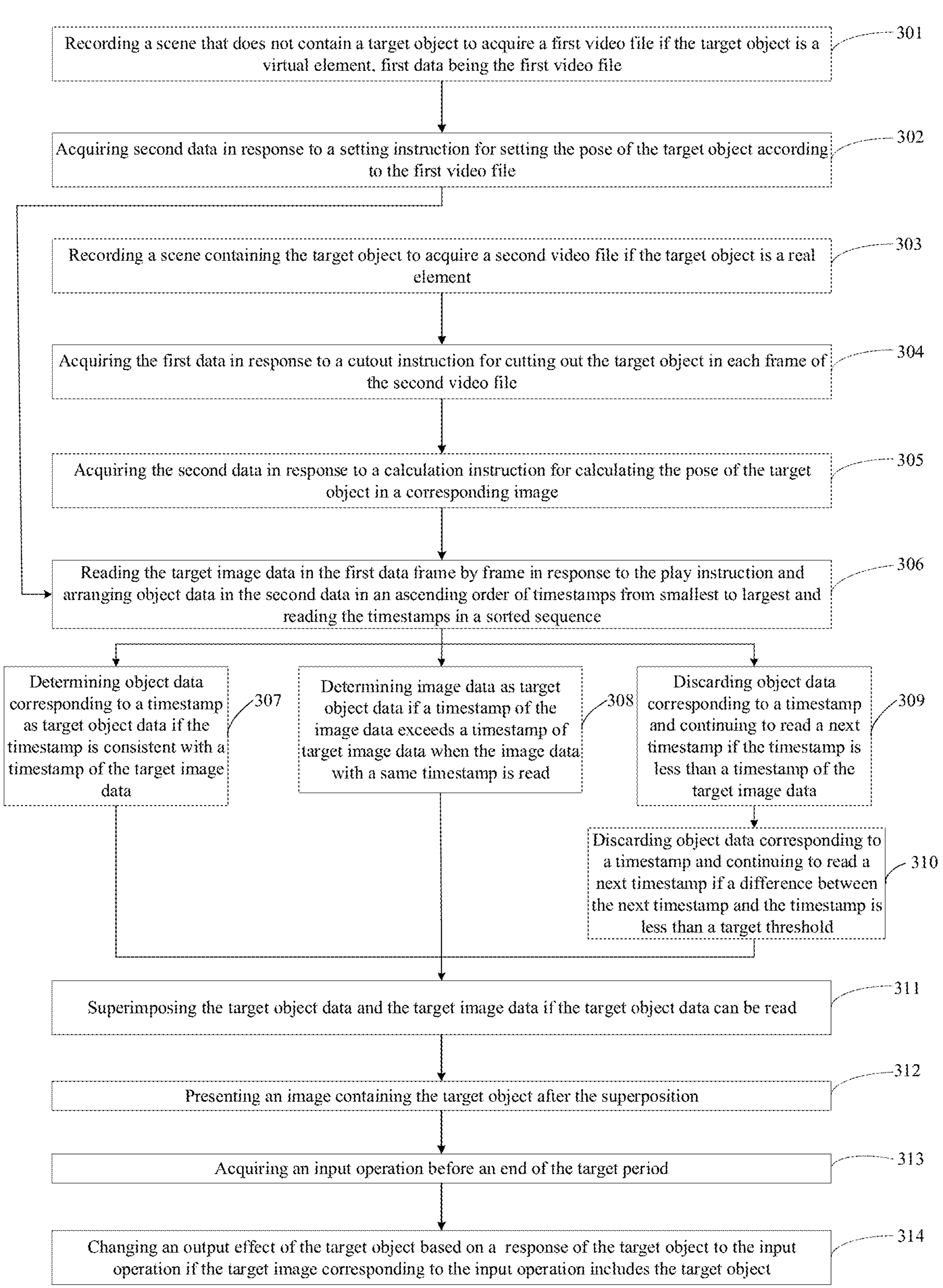
FIG. 3 illustrates a flow chart of another information processing method consistent with various embodiments of the present disclosure.

Technical solutions in embodiments of the present disclosure will be clearly and completely described below with reference to accompanying drawings in the embodiments of the present disclosure.

FIG. 1 illustrates a flow chart of an information processing method consistent with various embodiments of the present disclosure. The method is applied to electronic devices and may include the following steps.

S101: acquiring target data.

In one embodiment, an execution subject is an apparatus with a collection device and a playback device. The target data is collected by the collection device, and the playback device acquires the target data before playing. A method of the playback device acquiring the target data is not limited herein. In one situation, the collection device uploads the collected target data to a storage end, and the playback device acquires the target data from the storage end. In another situation, the collection device sends the target data directly to the playback device and the target data is stored in advance in the apparatus. The playback device acquires a complete target file, which at least includes the target data. The execution subject of the embodiment may also be an apparatus with only the playback device.

The target data refers to data that can continuously present a plurality of frames of images within a target period, and a specific form is not limited herein. For example, the target data includes a plurality of data streams. To operate a target object, there must be at least one target data stream related to the target object and an image data stream that does not include the target object among the plurality of data streams.

There is a certain correspondence between the target data stream and the image data stream.

S102: outputting the target data in response to a play instruction, the target data being configured to continuously present a plurality frame of images within the target period.

In one embodiment, the play instruction may be an instruction generated by triggering a playback of the acquired target data when the acquired target data needs to be played. In a feasible implementation, the play instruction may be generated after a user performs a playback operation on an electronic device when the target data needs to be played. The play instruction can also be automatically triggered and generated by the electronic device according to a preset playback time or cycle. Moreover, after receiving the play instruction, the electronic device can display the target data on a corresponding display screen in response to the play instruction.

S103: acquiring an input operation before end of the target period.

In one embodiment, during a process of outputting and displaying the target data according to the corresponding play instruction, an input operation for the target data is acquired. That is, the input operation may be received by the electronic device during a process of playing the target data.

In a feasible implementation, the input operation may be input by the user into the electronic device through the electronic device playing the target data during the process of playing the target data. The input operation may be generated for the target object in the target data.

S104: changing output effect of the target object in response to the input operation based on the target object if a target image corresponding to the input operation includes the target object.

The output effect changed by the target object in response to the input operation does not affect an output effect of the target object in a continuous presentation of a plurality of frames of images within the target period.

In one embodiment, after a user performs an input operation for a target image in the target data, if it is determined that there is a target object in a target image, it means that the target object in the target image can be operated. The input operation is intended to operate on the target object in the target image. Therefore, the electronic device can respond to the input operation to change the output effect of the target object displayed in the target image.

Changing the output effect of the target object based on the response of the target object to the input operation means that the output effect of the target object in the target image has not changed, that is the target object in the target image has not been changed prior to the input operation. When the target object responds to the input operation, the display data of the target object is read, and the target object is displayed again. An execution object of the input operation is the target object displayed again, and the target object displayed again is changed. In another situation, the output effect of the target object in the target image has changed, but after the object is reset, a final effect of continuous output is still the output effect changed by the input operation, which does not affect the output effect of the target object in the continuous presentation of a plurality of frames of images within the target period. In the above situation, without object reset, the input operation may only affect the output effect of the target object in a current target image and may not affect output effects of the target object in other images in a continuous presentation of the plurality of frames of images within the target period. That is, the input operation may only affect the display effect of the target object in the target image of a current frame targeted by the input operation but may not change display effects of the target object in images of other frames in a video, that is, the target object in the images of other frames in the video is still displayed according to the original target data.

In a feasible implementation manner, the target data may include augmented reality (AR) data, and the target object may refer to a virtual object in the AR data. The target data can be AR data recorded in one device but played back in another device when played.

In the embodiment, the information processing method can acquire an input operation from outside during a process of playing target data with a target object and change an output effect of the target object in response to the input operation. That is, when target data is output and displayed, interactive operations on the target object in the target data can be realized. The input operation does not affect the output effect of the target object during a continuous presentation of a plurality of frames of images within a target period, thereby solving an issue in multimedia sharing technology where interactions with an object in a multimedia file are impossible during playback and improving interaction enjoyments.

FIG. 2 illustrates a flow chart of another information processing method consistent with various embodiments of the present disclosure. In one embodiment, the method includes the following steps.

S201: acquiring target data including at least first data and second data, the first data including a plurality of frames of image data excluding the target object and the second data including a plurality of pieces of object data and the plurality of frames of image data corresponds to the plurality of pieces of object data.

In one embodiment, the target data may include at least first data and second data. The first data and the second data are two types of data. The first data refers to image data, and the second data refers to object data. The image data referred to by the first data does not include the target object. It should be noted that when the target data is acquired, the first data and the second data are collected in a corresponding relationship.

S202: reading target image data in the first data frame by frame in response to the play instruction and simultaneously reading target object data in the second data with a corresponding relationship with the target image data.

In one embodiment, because there is a corresponding relationship between the first data and the second data, when the first data is played in response to the play instruction, target image data corresponding to the play instruction in the first data may be read frame by frame continuously. Each frame is taken as a unit. While target image data is read, target object data corresponding to target image data in the second data can be read according to the corresponding relationship. It should be noted that not every frame of image data has corresponding object data. Images and the object with a corresponding relationship will be presented as image frames containing the object, while images and the object without a corresponding relationship will be presented as image frames without the object.

It should be noted that the target image data and the target object data can be read synchronously, or the target image data can be read first and then the target object data, or the target object data can be read first and then the target image data. The target image data and target object data must be read according to a corresponding relationship.

S203: superimposing the target object data and the target image data if the target object data can be read and presenting an image containing the target object after the superimposition.

In one embodiment, if the target object data is read, it means that the target data contains the target object. When displaying the target data, the read target image data and the target object data can be superimposed according to the corresponding relationship, and then played and displayed. That is, the target image data and the target object data need to be synthesized and video information including the target object is displayed.

S204: acquiring an input operation before end of a target period.

S205: changing output effect of the target object based on a response of the target object to the input operation if a target image corresponding to the input operation includes the target object.

The output effect changed by response of the target object to the input operation does not affect the output effect of the target object in a continuous presentation of a plurality of frames of images within the target period. It should be noted that descriptions of same steps and content in the embodiment as in other embodiments may be referenced to descriptions in other embodiments, which are not repeated herein.

The information processing method provided by the embodiment can acquire an input operation from outside and change the output effect of the target object in response to the input operation during a process of playing target data with the target object. That is, when the target data is output and displayed, interactive operations on the target object in the target data can be realized. The input operation may not affect the output effect of the target object in a continuous presentation of a plurality of frames of images within the target period. Therefore, through a collection and output of target data containing at least two streams, the interactive operations on the target object in the target data can be accurately realized.

FIG. 3 illustrates a flow chart of another information processing method consistent with various embodiments of the present disclosure. In one embodiment, the method includes the following steps.

S301: recording a scene that does not contain a target object to acquire a first video file if the target object is a virtual element, first data being the first video file.

In one embodiment, the target object may refer to a virtual object or a real object. If the target object is a virtual object (i.e., a virtual element), when the target data is acquired, the first data and the second data in the target data can be acquired respectively. That is, the electronic device can record scene information that does not include the target object, thereby acquiring the first video file (i.e., the first data). It should be noted that when the target object is a virtual object, the first recorded video file does not include image information of the target object.

S302: acquiring second data in response to a setting instruction for setting the pose of the target object according to the first video file.

In one embodiment, after the first video file is recorded and acquired, the electronic device can set pose information of the target object in the first video file based on the first video file to acquire the second data. That is, the second data is data about the pose information of the target object, and the second data is generated based on the first video file and is set in response to a setting instruction. A pose of the target object may refer to a position and posture of the target object in a corresponding frame in the first video.

It should be noted that if the target object is a virtual element, a set for the pose of the target object at least includes an operation instruction and a gesture for the target object. Subsequently, an image containing the target object after the superimposition is presented, which is a result of executing the operation instruction according to the gesture.

S303: recording a scene containing the target object to acquire a second video file if the target object is a real element.

In one embodiment, if the target object is a real object (that is, a real element), when the target data is acquired, the second video file can be acquired and processed to acquire the first data and the second data in the target data. That is, the electronic device can record the scene information with the target object to acquire the second video file. That is, the recorded second video file includes both the image information of the target object and some scene image information of the scene where the target object is located. It should be noted that when the target object is a real object, the recorded second video file includes image information of the target object.

S304: acquiring the first data in response to a cutout instruction for cutting out the target object in each frame of the second video file.

S305: acquiring the second data in response to a calculation instruction for calculating the pose of the target object in a corresponding image.

In one embodiment, after the second video file is recorded and acquired, the electronic device can process the second video file to acquire the first data and the second data. It should be noted that the electronic device can cut out the image information of the target object from each frame of the second video file in response to the cutout instruction, thereby acquiring the first data. That is, the first data refers to image information other than the target object in the second video file.

In addition, the electronic device can calculate the pose information of the target object in the second video file, acquire corresponding pose data from an image in the second video file, and acquire the second data. That is, when the target object is a real object, the pose information of the target object is recorded in real time when recording the second video file and does not need to be added additionally. It is necessary to calculate the pose information of the target object in the second video file to acquire the second data.

It should be noted that if the target object is a virtual object, S301~S302 are executed, and if the target object is a real object, S303~S305 are executed. S306 can be executed after S301 to S302 and after S303 to S305.

S306: reading the target image data in the first data frame by frame in response to the play instruction and arranging object data in the second data in an ascending order of timestamps from smallest to largest and reading the timestamps in a sorted sequence.

In one embodiment, when the electronic device reads the first data and the second data, the electronic device may read time stamps corresponding to the first data and the second data in an order from small to large, that is, the first data is read frame by frame in the order of recording time. The setting and calculation of the second data also correspond to the play order of the frames. For example, a final presented video has 100 frames, with a timestamp of the first frame being 0 s, a timestamp of the second frame being 0.5 s, and so on. If a virtual object is set in a first frame or if a real object exists during shooting, a timestamp of the first object data in the corresponding second data is 0 s. If there is no virtual object set in the first frame or if a real object exists during shooting, then there is no 0 s timestamp in the corresponding second data or object data of the 0 s timestamp is empty, which ensures that the first data and the second data are read according to the corresponding relationship, thereby avoiding a loss of data information, and ensuring a data integrity of the read first data and the second data.

It should be noted that S307, or S308, or S309~S310 may be executed after S306.

S307: determining object data corresponding to a timestamp as the target object data if the timestamp is consistent with a timestamp of the target image data.

In one embodiment, if a timestamp of the object data in the read second data is consistent with a timestamp of the target image data, it means that there is a corresponding relationship between the object data and the target image data in the read second data, allowing for a determination that the read object data is the target object data.

S308: determining image data as target object data if a timestamp of the image data exceeds a timestamp of target image data when the image data with a same timestamp is read.

In one embodiment, if a timestamp of the object data in the read second data exceeds a timestamp of the target image data, it means that there is no corresponding relationship between the object data in the read second data and the target image data. When the image data with a same time stamp as the time stamp of the object data in the second data is read, the image data with the same time stamp is read. The image data with the same time stamp has a corresponding relationship with the object data in the read second data, allowing for a determination that the image data with the same time stamp is the target object data.

S309: discarding object data corresponding to a timestamp and continuing to read a next timestamp if the timestamp is less than a timestamp of the target image data.

In one embodiment, if a timestamp of the object data in the read second data is less than a timestamp of the target image data, it means that there is no corresponding relationship between the object data in the read second data and the target image data. Because the timestamp of the object data in the read second data is smaller than a timestamp of the target image data, it means that the image data corresponding to the timestamp of the object data in the read second data has been missed. the object data in the second data read can be abandoned and continue to read the object data of a next timestamp in the second data.

S310: discarding object data corresponding to a timestamp and continuing to read a next timestamp if a difference between the next timestamp and the timestamp is less than a target threshold.

In one embodiment, after reading the object data of a next timestamp, it is necessary to determine a difference between the next timestamp of the object data of the next timestamp and the timestamp. If the difference is less than a target threshold, it means that an interval between the two timestamps is too small and is considered that the object data is read too frequently. If the object data read at the next timestamp is invalid data, the object data read at the next timestamp will be discarded. The object data of the next timestamp will continue to be read until the difference between the read timestamps is greater than or equal to the target threshold and is consistent with a timestamp of the read image data.

It should be noted that S311 can be executed after S307, S308 and S310.

S311: superimposing the target object data and the target image data if the target object data can be read.

S312: presenting an image containing the target object after the superposition.

S313: acquiring an input operation before end of the target period.

S314: changing output effect of the target object based on a response of the target object to the input operation if the target image corresponding to the input operation includes the target object.

The output effect changed by the target object in response to the input operation does not affect the output effect of the target object in a continuous presentation of the plurality of frames of images within the target period.

In some other embodiments, the method may further include the following steps.

S315: responding to a pause instruction for pausing an output of the target data.

It should be noted that S315 can be performed before S314. That is, before responding to the input operation, a pause instruction for pausing an output of the target data is received, and the electronic device may respond to the pause instruction by pausing a playback of the target data.

S316: restoring an output effect of the target object to an output effect of the target image in response to a cancellation instruction for cancelling the input operation.

In one embodiment, S316 may be performed after S315. That is, after the electronic device outputs a target object that changes the output effect in response to the input operation, if the electronic device receives a cancel instruction for canceling the input operation, that is, if a user wants to restore the output effect of the target object to an original output effect, the user can continue to change the output effect of the target object so that the output effect of the target object is changed to (that is, restored to) the output effect in the target image before the change. In the embodiment, in a process of restoring the output effect of the target object, it is necessary to pause a playback of the target data first.

S317: continuously outputting the target data in response to a play instruction.

After the output effect of the target object is restored, the target data can still be played and displayed in response to the play instruction.

In some other embodiments, the method may further include following step(s).

S318: continuously outputting the target data, so that the target object that changes an output effect is presented simultaneously with an image to be presented.

In one embodiment, the target data can be played and displayed all the time; during a process of playing and displaying the target data, the output effect of the target object is directly restored to the output effect before the change in the target image and played and displayed together with the target data. That is, during a process of restoring the output effect of the target object, the target data does not stop playing, and the restored target object and the target data are displayed and output simultaneously.

It should be noted that descriptions of same steps and content in the embodiment as in other embodiments may be referenced to descriptions in other embodiments, which are not repeated herein.

Figure 4:
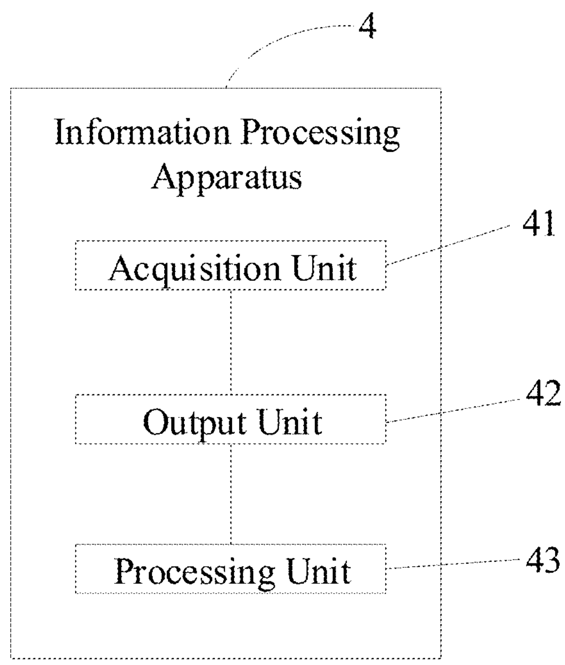
FIG. 4 illustrates a schematic diagram of an information processing apparatus consistent with various embodiments of the present disclosure.

Based on the above embodiments, FIG. 4 illustrates a schematic diagram of an information processing apparatus consistent with various embodiments of the present disclosure. The information processing apparatus can be applied to the information processing method provided by the embodiments corresponding to FIGS. 1-3. Referring to FIG. 4, an information processing device 4 can include an acquisition unit 41, an output unit 42 and a processing unit 43.

The acquisition unit 41 is configured to acquire target data. The output unit 42 is configured to output the target data in response to a play instruction. The target data is configured to continuously present a plurality of frames of images within a target period. The acquisition unit 41 is also configured to acquire an input operation before end of the target period. The processing unit 43 is configured to respond to the input operation based on a target object to change an output effect of the target object if the target image corresponding to the input operation includes the target object. The output effect changed by the target object in response to the input operation does not affect the output effect of the target object in a continuous presentation of the plurality of frames of images within the target period.

In other embodiments, the acquisition unit 41 is also configured to acquire the target data including at least first data and second data. The first data includes a plurality of frames of image data not including the target object. The second data includes a plurality of pieces of object data with a corresponding relationship between the plurality of frames of image data and the plurality of pieces of object data.

Accordingly, the output unit 42 is also configured to perform the following steps: reading the target image data in the first data frame by frame, and simultaneously read the target object data in the second data that has a corresponding relationship with the target image data; superimposing the target object data and the target image data if the target object data can be read; and presenting an image containing the target object after the superimposition.

In other embodiments, the output unit 42 is also configured to perform the following steps: arranging object data in the second dataset in an ascending order of timestamps from smallest to largest, and reading the timestamps in a sorted sequence; determining object data corresponding to a timestamp as the target object data if the timestamp is consistent with a timestamp of target image data; discarding object data corresponding to a timestamp and continuing to read a next timestamp if the timestamp is less than a timestamp of the target image data; and determining image data as target object data if a timestamp of the image data exceeds a timestamp of target image data when the image data with a same timestamp is read.

In other embodiments, the processing unit 43 is also configured to discard object data corresponding to a timestamp if a difference between a next timestamp and the timestamp is less than a target threshold and continue to read the next time stamp.

In other embodiments, the acquisition unit 41 is also configured to perform the following steps: recording the first video file for a scene that does not contain the target object if the target object is a virtual element, the first data being a first video file; and acquiring the second data in response to a setting instruction for setting a pose of the target object according to the first video file.

In other embodiments, the acquisition unit 41 is also configured to perform the following steps: recording a scene containing the target object to acquire a second video file if the target object is a real element; acquiring the first data in response to a cutout instruction for cutting out the target object in each frame of the second video file; and acquiring the second data in response to a calculation instruction for calculating a pose of the target object in a corresponding image.

Accordingly, the output unit 42 is also configured to perform the following steps: restoring an output effect of the target object to an output effect of the target image in response to a cancellation instruction for canceling the input operation; and continuously outputting the target data in response to the play instruction.

In other embodiments, the output unit 42 is also configured to continuously output target data, so that the target object that changes an output effect is presented simultaneously with an image to be presented.

It should be noted that specific descriptions of steps performed by each unit can be referred to the information processing method provided by corresponding embodiments in FIGS. 1-3, which are not repeated herein.

Figure 5:
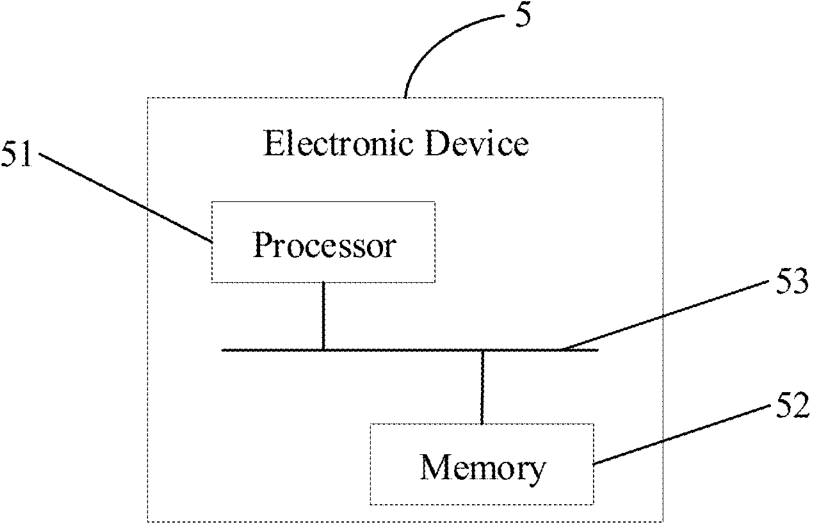
FIG. 5 illustrates a schematic diagram of an electronic device consistent with various embodiments of the present disclosure.

Based on the above embodiments, FIG. 5 illustrates a schematic diagram of an electronic device consistent with various embodiments of the present disclosure. In one embodiment, an electronic device 5 includes: a processor 51, a memory 52 and a communication bus 53. The communication bus 53 is configured for realizing a communication connection between the processor 51 and the memory 52. The processor 51 is configured to execute an information processing program in the memory 52 to implement the following steps: acquiring target data; outputting the target data in response to a play instruction, the target data being configured to continuously present a plurality of frames of images within a target period; acquiring an input operation before an end of the target period; and changing an output effect of a target object based on a response of the target object to the input operation if a target image corresponding to the input operation includes the target object. The output effect changed by the response of the target object to the input operation does not affect the output effect of the target object in a continuous presentation of the plurality of frames of images within the target period.

In other embodiments, the processor 51 is configured to execute the information processing program in the memory 52 to acquire target data and implement the following steps: acquiring the target data including at least first data and second data; the first data including a plurality of frames of image data excluding the target object, the second data including a plurality of pieces of object data, with a corresponding relationship between the plurality of frames of image data and a plurality of pieces of object data.

Accordingly, the processor 51 is configured to outputting the target data of the information processing program in the memory 52 and implement the following steps: reading target image data in the first data frame by frame, and simultaneously reading target object data in the second data with a corresponding relationship with the target image data; superimposing the target object data and the target image data if the target object data can be read; and presenting an image containing the target object after the superimposition.

In other embodiments, the processor 51 is configured to execute the information processing program in the memory 52 and simultaneously read the target object data with a corresponding relationship with the target image data from the second data, to implement the following steps: arranging object data in the second data in an ascending order of timestamps from smallest to largest, and reading the timestamps in a sorted sequence; determining object data as target object data if a timestamp of the object data is consistent with a timestamp of target image data; discarding object data corresponding to a timestamp and continuing to read a next timestamp if the timestamp is less than a timestamp of the target image data; and determining image data as target object data if a timestamp of the image data exceeds a timestamp of target image data when the image data with a same timestamp is read.

In other embodiments, the processor 51 is configured to execute the information processing program in the memory 52 and can further implement a following step: discarding object data corresponding to a timestamp and continuing to read a next timestamp if a difference between the next timestamp and the timestamp is less than a target threshold.

In other embodiments, the processor 51 is configured to execute an information processing program in the memory 52 to acquire target data including at least the first data and the second data, and implement the following steps: recording a scene that does not contain a target object to acquire a first video file if the target object is a virtual element, first data being the first video file; and acquiring second data in response to a setting instruction for setting a pose of the target object according to the first video file.

In other embodiments, the processor 51 is configured to execute the information processing program in the memory 52 to acquire the target data including at least the first data and the second data, to implement the following steps: recording a scene containing the target object to acquire a second video file if the target object is a real element; acquiring the first data in response to a cutout instruction for cutting out the target object in each frame of the second video file; and acquiring the second data in response to a calculation instruction for calculating a pose of the target object in a corresponding image.

In other embodiments, the processor 51 is configured to execute the information processing program in the memory 52 and can further implement a following step: responding to a pause instruction for pausing an output of the target data.

Accordingly, the processor 51 is configured to execute the information processing program in the memory 52 and can also implement the following steps: restoring an output effect of the target object to an output effect of the target image in response to a cancellation instruction for cancelling the input operation; and continuously outputting the target data in response to a play instruction.

In other embodiments, the processor 51 is configured to execute the information processing program in the memory 52 and can also implement a following step: continuing to output target data, so that the target object that changes an output effect is presented simultaneously with an image to be presented.

It should be noted that, for a specific implementation process of the steps executed by the processor in the embodiment, reference can be made to the implementation process in the information processing method provided by corresponding embodiments shown in FIGS. 1-3, which is not repeated herein.

Based on the above embodiments, a computer-readable storage medium is provided in one embodiment. The computer-readable storage medium stores one or more programs, and the one or more programs can be executed by one or more processors to implement steps of the information processing method provided by the embodiments corresponding to FIGS. 1-3.

A person skilled in the art should understand that embodiments of the present disclosure may be provided as methods, systems, or computer program products. Therefore, the present disclosure may take a form of a hardware embodiment, a software embodiment, or an embodiment combining software and hardware aspects. The present disclosure may take a form of a computer program product implemented on one or more computer-usable storage media (including but not limited to disk storage and optical storage and the like) embodying computer-usable program code.

The present disclosure is described with reference to flowchart illustrations and/or block diagrams of methods, apparatus (systems), and computer program products according to the embodiments of the present disclosure. Each process and/or block of the flowchart illustrations and/or block diagrams, and combinations of processes and/or blocks in the flowchart illustrations and/or block diagrams, can be implemented by computer program instructions. The computer program instructions may be provided to a processor of a general purpose computer, special purpose computer, embedded processor, or other programmable data processing device to produce a machine, such that the instructions executed by a processor of a computer or other programmable data processing device produce instructions for implementing functions specified in a process or processes of a flow diagram and/or a block or block diagrams.

The computer program instructions may also be stored in a computer-readable memory that can direct a computer or other programmable data processing apparatus to function in a particular manner, such that the instructions stored in the computer-readable memory produce an article of manufacture including the instruction device, which implements functions specified in a process or processes of the flowchart and/or a block or blocks of the block diagram.

The computer program instructions may also be loaded onto a computer or other programmable data processing apparatus to cause a series of operational steps to be performed on the computer or other programmable apparatus to produce a computer-implemented process, such that the instructions which execute on the computer or other programmable apparatus provide steps for implementing the functions specified in the flow diagram process or processes and/or the block diagram block or blocks.

As disclosed, the information processing method, the information processing apparatus, and the electronic device provided by the present disclosure at least realize the following beneficial effects.

The information processing method can acquire an input operation from outside during a process of playing target data with a target object and change output effect of the target object in response to the input operation. That is, when target data is output and displayed, interactive operations on the target object in the target data can be realized. The input operation does not affect the output effect of the target object during a continuous presentation of a plurality of frames of images within a target period, thereby solving an issue in multimedia sharing technology where interactions with an object in a multimedia file are impossible during playback and improving interaction enjoyments.

The above descriptions are only preferred embodiments of the present disclosure and are not intended to limit the protection scope of the present disclosure.

What is claimed is:

1. An information processing method, comprising:

acquiring target data;

outputting the target data in response to a play instruction, the target data being configured to continuously present a plurality of frames of images within a target period;

acquiring an input operation before an end of the target period; and changing an output effect of a target object in a target image corresponding to the input operation based on a response of the target object to the input operation, the output effect changed by the response of the target object to the input operation not affecting the output effect of the target object in a continuous presentation of the plurality of frames of images within the target period.

2. The method according to claim 1, wherein:

the acquiring target data includes:

acquiring the target data including at least first data and second data, and the first data including a plurality of frames of image data excluding the target object, the second data including a plurality of pieces of object data with a corresponding relationship between the plurality of frames of image data and the plurality of pieces of object data; and the outputting the target data includes:

reading the target image data in the first data frame by frame, and simultaneously reading target object data in the second data with a corresponding relationship with the target image data, superimposing the target object data and the target image data if the target object data can be read, and presenting an image containing the target object after the superimposition.

3. The method according to claim 2, wherein simultaneously reading the target object data in the second data with the corresponding relationship with the target image data includes:

arranging object data in the second data in an ascending order of timestamps from smallest to largest, and reading the timestamps in a sorted sequence;

determining object data corresponding to a timestamp as the target object data if the timestamp is consistent with a timestamp of the target image data;

discarding object data corresponding to a timestamp and continuing to read a next timestamp if the timestamp is less than a timestamp of the target image data; and determining image data as target object data if a timestamp of the image data exceeds a timestamp of target image data when the image data with a same timestamp is read.

4. The method according to claim 3, after the continuing to read a next timestamp, further comprising:

discarding object data corresponding to a timestamp and continuing to read a next timestamp if a difference between the next timestamp and the timestamp is less than a target threshold.

5. The method according to claim 2, wherein the acquiring target data including at least first data and second data includes:

recording a scene that does not contain the target object to acquire a first video file if the target object is a virtual element, the first data being the first video file; and acquiring the second data in response to a setting instruction for setting a pose of the target object according to the first video file.

6. The method according to claim 2, wherein the acquiring target data including at least first data and second data further includes:

recording a scene containing the target object to acquire a second video file if the target object is a real element;

acquiring the first data in response to a cutout instruction for cutting out the target object in each frame of the second video file; and acquiring the second data in response to a calculation instruction for calculating a pose of the target object in the corresponding image.

7. The method according to claim 1, before changing the output effect of the target object based on the response of the target object to the input operation, further comprising:

responding to a pause instruction for pausing an output of the target data.

8. The method according to claim 1, after changing the output effect of the target object based on the response of the target object to the input operation, further comprising:

restoring an output effect of the target object to the output effect in the target image in response to a cancellation instruction for canceling the input operation; and continuing to output the target data in response to the play instruction.

9. The method according to claim 1, further comprising:

continuously outputting the target data, so that the target object that changes an output effect is presented simultaneously with an image to be presented.

10. An information processing apparatus, comprising:

an acquisition unit, for acquiring target data and acquiring an input operation before an end of a target period;

an output unit, for outputting the target data in response to a play instruction, the target data being configured to continuously present a plurality of frames of images within the target period; and a processing unit, for changing an output effect of a target object in a target image corresponding to the input operation based on a response of the target object to the input operation, the output effect changed by the response of the target object to the input operation not affecting the output effect of the target object in a continuous presentation of the plurality of frames of images within the target period.

11. An electronic device, comprising at least one processor, a memory, and a communication bus, wherein:

the communication bus is configured to realize a communication connection between the at least one processor and the memory; and the at least one processor is configured to execute an information processing program in the memory to perform the method according to claim 1.

12. The electronic device according to claim 11, wherein the at least one at least one is further configured to perform:

acquiring the target data including at least first data and second data, and the first data including a plurality of frames of image data excluding the target object, the second data including a plurality of pieces of object data with a corresponding relationship between the plurality of frames of image data and the plurality of pieces of object data; and reading the target image data in the first data frame by frame, and simultaneously reading target object data in the second data with a corresponding relationship with the target image data, superimposing the target object data and the target image data if the target object data can be read, and presenting an image containing the target object after the superimposition.

13. The electronic device according to claim 11, wherein the at least one at least one is further configured to perform:

arranging object data in the second data in an ascending order of timestamps from smallest to largest, and reading the timestamps in a sorted sequence;

determining object data corresponding to a timestamp as the target object data if the timestamp is consistent with a timestamp of the target image data;

discarding object data corresponding to a timestamp and continuing to read a next timestamp if the timestamp is less than a timestamp of the target image data; and determining image data as target object data if a timestamp of the image data exceeds a timestamp of target image data when the image data with a same timestamp is read.

14. The electronic device according to claim 13, wherein the at least one at least one is further configured to perform:

discarding object data corresponding to a timestamp and continuing to read a next timestamp if a difference between the next timestamp and the timestamp is less than a target threshold.

15. The electronic device according to claim 11, wherein the at least one at least one is further configured to perform:

recording a scene that does not contain the target object to acquire a first video file if the target object is a virtual element, the first data being the first video file; and acquiring the second data in response to a setting instruction for setting a pose of the target object according to the first video file.

16. The electronic device according to claim 11, wherein the at least one at least one is further configured to perform:

recording a scene containing the target object to acquire a second video file if the target object is a real element;

acquiring the first data in response to a cutout instruction for cutting out the target object in each frame of the second video file; and acquiring the second data in response to a calculation instruction for calculating a pose of the target object in the corresponding image.

17. The electronic device according to claim 11, wherein the at least one at least one is further configured to perform:

responding to a pause instruction for pausing an output of the target data.

18. The electronic device according to claim 11, wherein the at least one at least one is further configured to perform:

restoring an output effect of the target object to the output effect in the target image in response to a cancellation instruction for canceling the input operation; and continuing to output the target data in response to the play instruction.

19. The electronic device according to claim 11, wherein the at least one at least one is further configured to perform:

continuously outputting the target data, so that the target object that changes an output effect is presented simultaneously with an image to be presented.

20. An information processing method, comprising:

acquiring target data;

outputting the target data in response to a play instruction, the target data being configured to continuously present a plurality of frames of images within a target period;

acquiring an input operation before an end of the target period;

changing an output effect of a target object based on a response of the target object to the input operation if a target image corresponding to the input operation includes the target object, the output effect changed by the response of the target object to the input operation not affecting the output effect of the target object in a continuous presentation of the plurality of frames of images within the target period;

restoring an output effect of the target object to the output effect in the target image in response to a cancellation instruction for canceling the input operation; and continuing to output the target data in response to the play instruction.

* * * * *